(12) United States Patent
Motoda et al.

(10) Patent No.: US 9,356,494 B2
(45) Date of Patent: May 31, 2016

(54) ELECTRONIC CONTROL DEVICE

(71) Applicant: HITACHI AUTOMOTIVE SYSTEMS, LTD., Hitachinaka-shi, Ibaraki (JP)

(72) Inventors: Haruaki Motoda, Isesaki (JP); Katsumasa Hagiwara, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 355 days.

(21) Appl. No.: 14/025,348

(22) Filed: Sep. 12, 2013

(65) Prior Publication Data

US 2014/0265749 A1 Sep. 18, 2014

(30) Foreign Application Priority Data

Mar. 15, 2013 (JP) .................................. 2013-052782

(51) Int. Cl.
*H02K 11/00* (2006.01)
*H02K 5/22* (2006.01)

(52) U.S. Cl.
CPC ............ *H02K 11/0073* (2013.01); *H02K 5/225* (2013.01); *H02K 11/30* (2016.01); *H02K 11/33* (2016.01)

(58) Field of Classification Search
CPC ...... H02K 3/552; H02K 3/50; H02K 11/0068
USPC .................................................. 310/68 R, 71
See application file for complete search history.

(56) References Cited

U.S. PATENT DOCUMENTS

| | | | |
|---|---|---|---|
| 6,756,711 B2 * | 6/2004 | Matsuyama et al. ........ | 310/68 R |
| 8,866,357 B2 * | 10/2014 | Yamasaki et al. ............... | 310/89 |
| 2006/0006094 A1 * | 1/2006 | Hofmann et al. ............. | 206/706 |
| 2007/0007833 A1 * | 1/2007 | Kitagawa ........................ | 310/71 |
| 2011/0259005 A1 | 10/2011 | Kikuchi et al. | |
| 2012/0063188 A1 * | 3/2012 | Hotta et al. .................... | 363/144 |
| 2012/0286604 A1 * | 11/2012 | Abe et al. ........................ | 310/71 |

FOREIGN PATENT DOCUMENTS

JP      2010-132102 A      6/2010

* cited by examiner

*Primary Examiner* — Hanh Nguyen
(74) *Attorney, Agent, or Firm* — Foley & Lardner LLP (57) ABSTRACT

An electronic control device including two housings coupled to each other, a first circuit board disposed in one of the two housings, a first terminal disposed on a side of the other of the two housings, and a second terminal disposed on the first circuit board in an opposed relation to the first terminal, wherein the first terminal and the second terminal are brought into direct connection with each other at a time at which the two housings are coupled to each other.

8 Claims, 11 Drawing Sheets

ELECTRONIC CONTROL DEVICE

BACKGROUND OF THE INVENTION

The present invention relates to an electronic control device for controlling an electric motor mounted to a vehicle, for instance, an electric motor of an electric power steering apparatus (EPS).

Japanese Patent Application Unexamined Publication No. 2010-132102 discloses an electronic control device for an electric motor mounted to a vehicle. The electronic control device includes a motor control unit including a power substrate to which a power terminal member is mounted, an electric source substrate and a connector.

DC output terminals of the power terminal member are connected to DC terminals of the power substrate by wire bonding. AC terminals of the power substrate are connected to AC input terminals of the power terminal member by wire bonding.

A DC bus bar of the electric source substrate is connected to a power terminal of the connector by welding. A relay and a smoothing capacitor are connected to the DC bus bar by welding. DC input terminals of the power terminal member are connected to the smoothing capacitor by welding.

SUMMARY OF THE INVENTION

However, in the electronic control device of the above conventional art, the DC bus bar for wire bonding and welding is necessary. Therefore, the number of parts is increased to thereby cause increase in part procurement cost and capital investment expenses which results in increased cost of the electronic control device as a product.

It is an object of the present invention to provide an electronic control device capable of reducing the number of parts and serving for cost saving.

In one aspect of the present invention, there is provided an electronic control device for controlling an operation of an electric motor for use in a vehicle that is driven by the electric motor, the electronic control device including:

two housings coupled to each other;
a first circuit board disposed in one of the two housings;
a first terminal disposed on a side of the other of the two housings; and
a second terminal disposed on the first circuit board in an opposed relation to the first terminal,
wherein the first terminal and the second terminal are brought into direct connection with each other at a time at which the two housings are coupled to each other.

An electronic control device of the present invention can be reduced in number of parts, thereby serving to reduce the production cost.

Other objects and features of this invention will become understood from the following description with reference to the accompanying drawings.

DETAILED DESCRIPTION OF THE INVENTION

Figure 7:
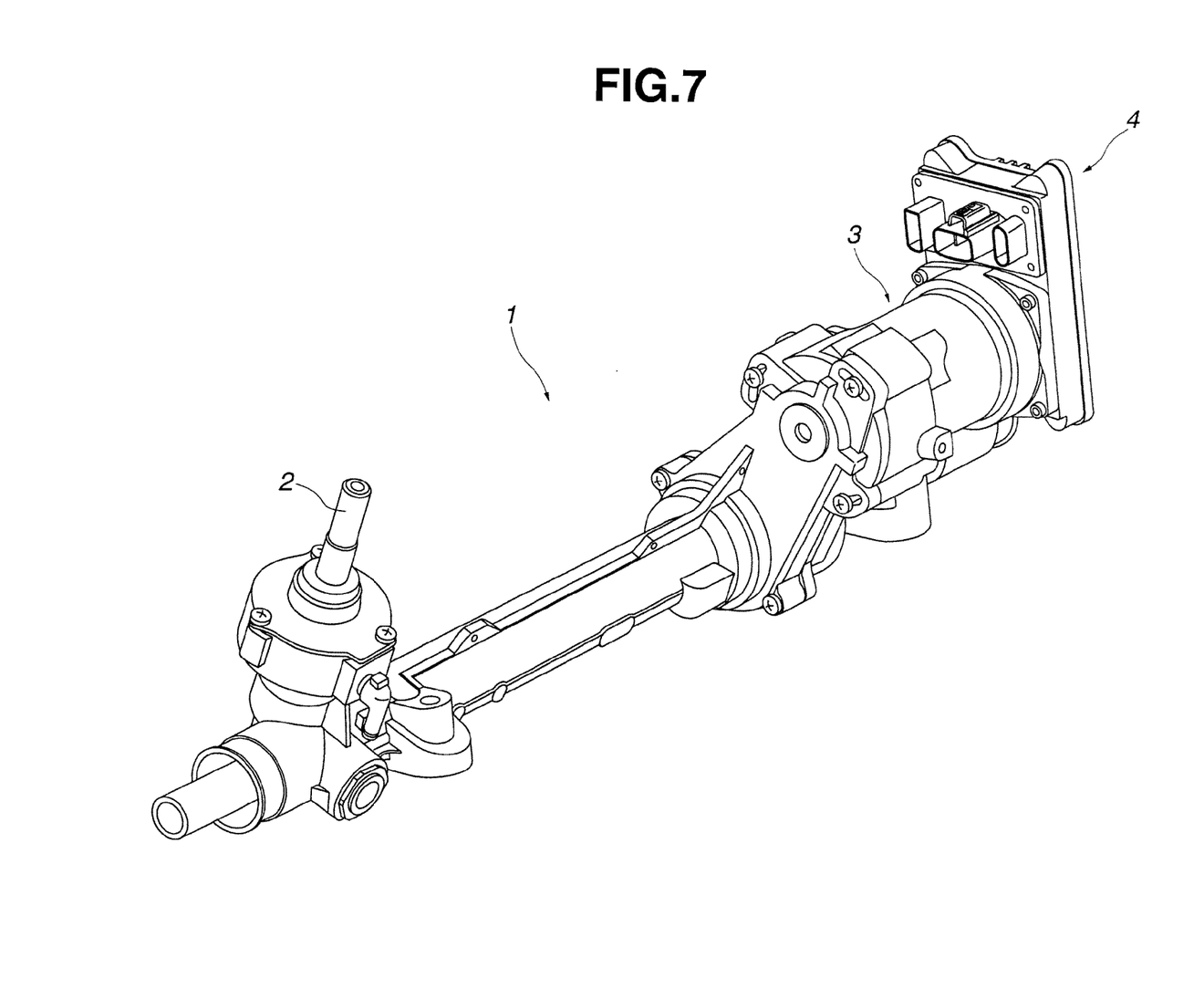
FIG. 7 is a perspective view of an electric power steering apparatus.

In the following, an electronic control device according to each of embodiments of the present invention which is applied to an electric power steering apparatus is explained by referring to the drawings. For ease of understanding, directional terms, such as "upper", "upward", "lower", "downward", etc. are used in the following description, but merely denote directions as viewed in the drawings. FIG. 7 shows electric power steering apparatus 1 including input shaft 2 to which steering torque is inputted from a steering wheel, and motor unit 3 that serves to generate assist torque for assisting the steering torque. Motor unit 3 is drivingly controlled by electronic control unit (ECU) 4. The electronic control device according to each of the embodiments is applied to electronic control unit (ECU) 4.

[First Embodiment]

Figure 1:
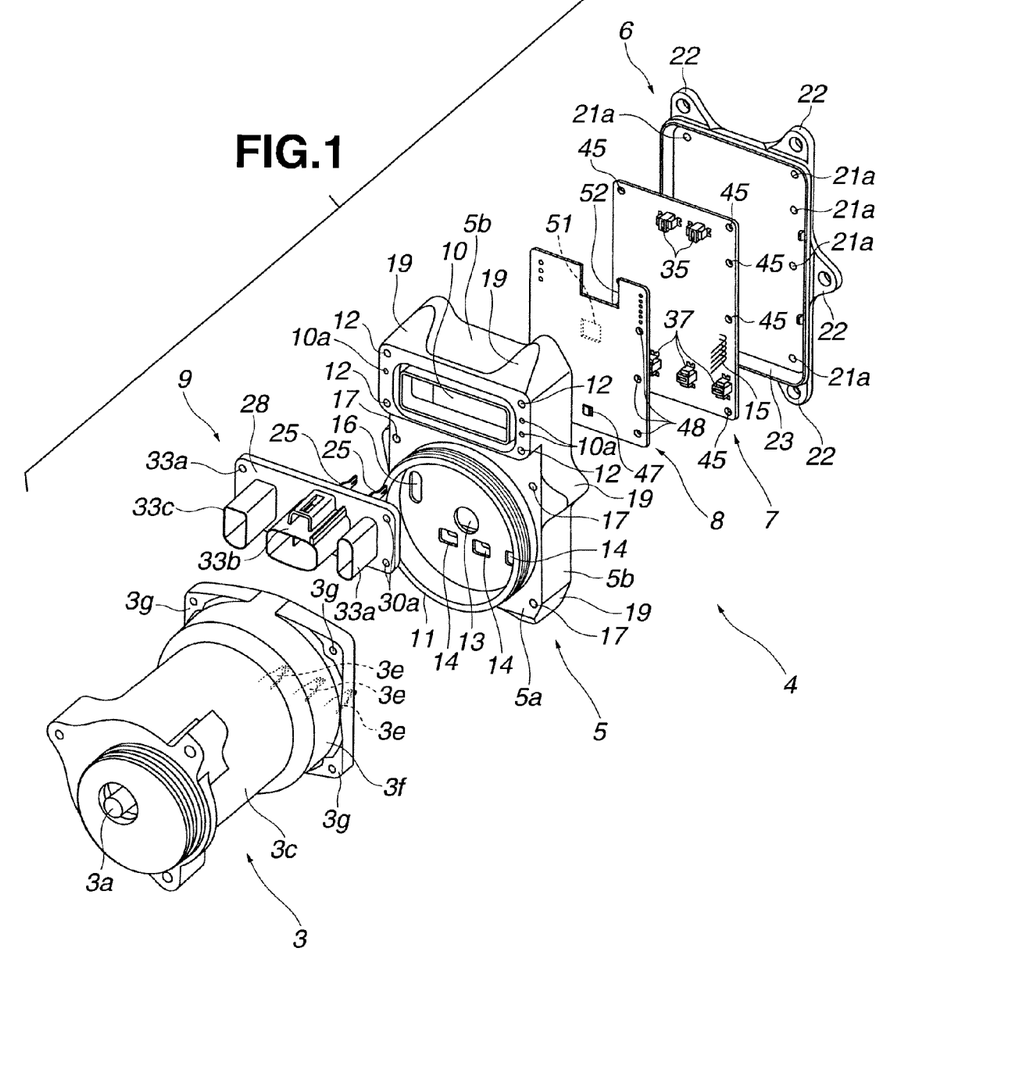
FIG. 1 is an exploded perspective view of an electronic control device according to a first embodiment of the present invention.
Figure 2:
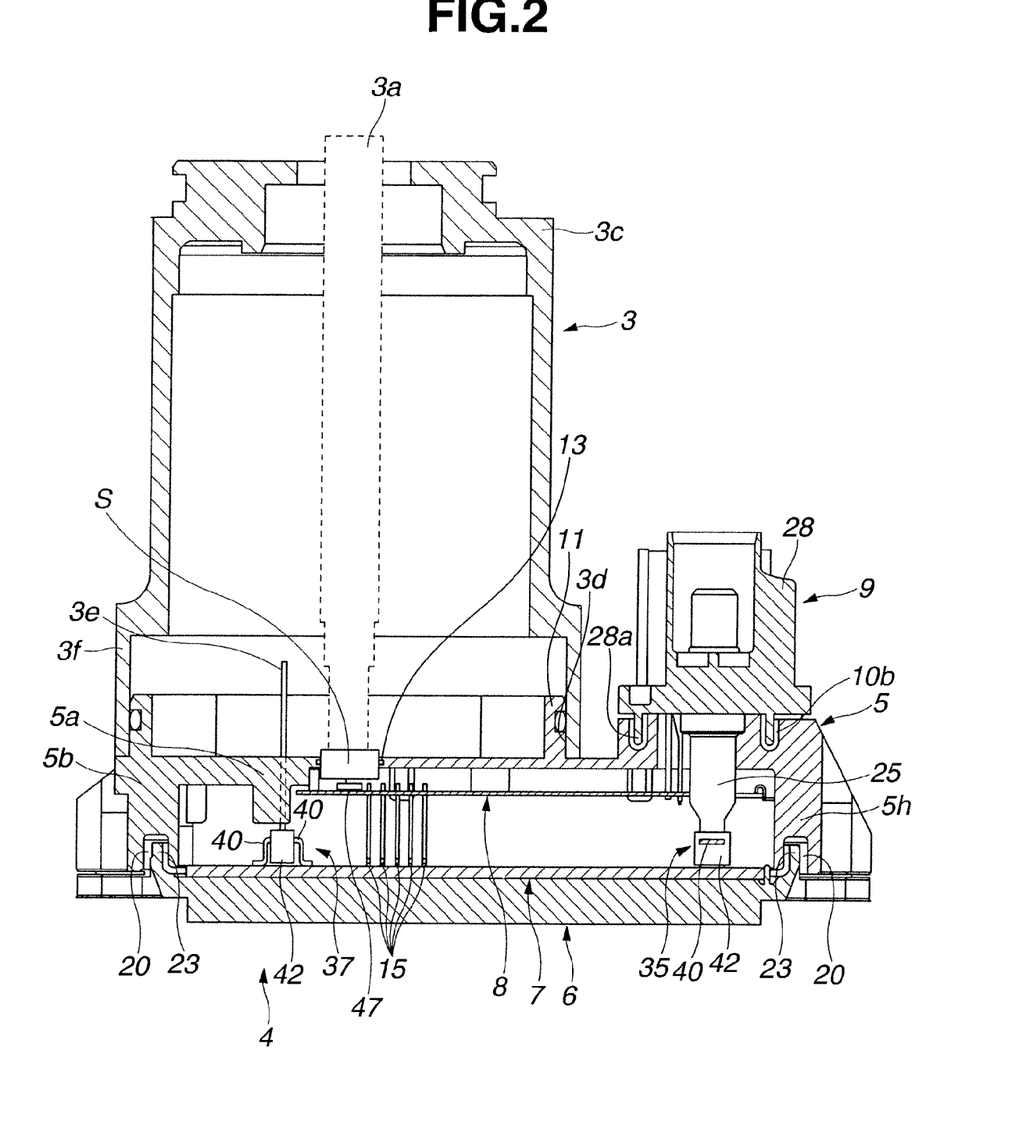
FIG. 2 is a vertical cross section of an essential part of the electronic control device according to the first embodiment of the present invention which is mounted to a motor unit.
Figure 3:
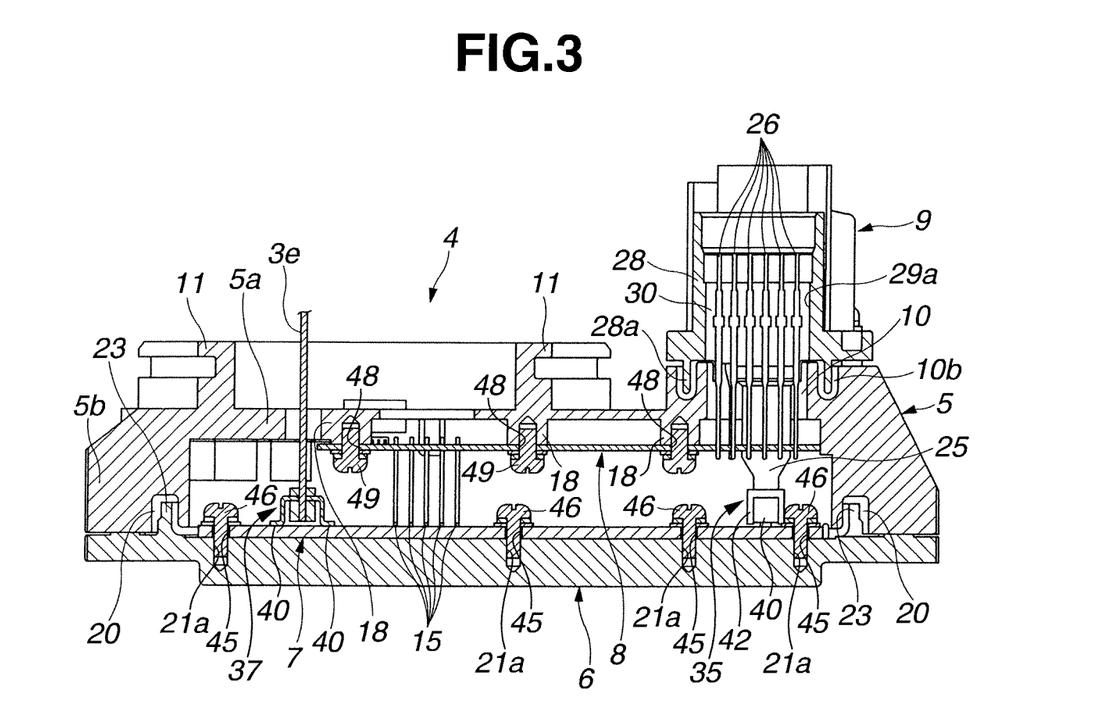
FIG. 3 is a vertical cross section of the electronic control device according to the first embodiment of the present invention.

Referring to FIG. 1 to FIG. 6, electronic control unit 4 according to a first embodiment of the present invention will be explained hereinafter. As shown in FIG. 1 to FIG. 3, electronic control unit 4 is disposed on a side of one end of motor shaft 3a of motor unit 3 (on a side opposite to an output-side end of motor shaft 3a, that is, on a side of an end of motor shaft 3a which is opposed to control circuit board 8 as explained later).

Motor unit 3 includes an electric motor (a three-phase AC brushless motor), not shown, motor housing 3c in which the electric motor is accommodated, motor shaft 3a that is rotatably driven by the electric motor, magnet S attached to the one end of motor shaft 3a and cooperating with Hall element 47 to detect rotation of motor shaft 3a as explained later, and first current-carrying terminal (three-phase motor terminal) 3e connected with each of three-phase terminals of the electric motor. Motor shaft 3a is rotated by driving the electric motor, thereby generating assist torque for assisting steering torque through a speed reducer, not shown. Motor housing 3c includes outer jacket portion 3f formed on a side of electronic control unit 4. Outer jacket portion 3f is increased in outer dimension.

Electronic control unit 4 includes casing (housing) 5 fixed to outer jacket portion 3f of motor housing 3c, cover (housing) 6 coupled to casing 5, drive circuit board 7 that serves to drive the electric motor, control circuit board 8 that is configured to control drive of drive circuit board 7, and electric connector 9 that serves to supply electric power from a power supply battery (not shown) to respective circuit boards 7, 8 and the electric motor. Drive circuit board 7 and control circuit board 8 are disposed between casing 5 and cover 6.

Specifically, casing 5 is made of a metal material, for instance, aluminum alloy, and has a rectangular box shape which is opened at one end, i.e., at a lower end thereof when viewed in FIG. 2. Casing 5 includes rectangular bottom wall 5a and four side walls 5b connected with bottom wall 5a. Side walls 5b extend upright from four side peripheries of bottom wall 5a, and are connected to each other. As shown in FIG. 1, bottom wall 5a includes a projecting portion formed on an upper portion of an outer surface of bottom wall 5a which is opposed to a side of motor housing 3c. The projecting portion projects in a direction opposite to side walls 5b, i.e., in a direction toward motor housing 3c.

The projecting portion of bottom wall 5a defines rectangular opening 10 to which electric connector 9 is coupled. A plurality of holes 10a are formed in an outer peripheral portion of the projecting portion which surrounds opening 10. Threaded hole 12 for fixing electric connector 9 to the projecting portion is formed at each of four corners of the projecting portion.

As shown in FIG. 1, bottom wall 5a also includes annular joint portion 11 formed on a lower portion of the outer surface of bottom wall 5a. Joint portion 11 extends in the direction toward motor housing 3c. Joint portion 11 is fitted into opening 3d of outer jacket portion 3f of motor housing 3c. Four threaded holes 17 for fixing casing 5 to outer jacket portion 3f are formed at four corners of the lower portion of bottom wall 5a which are located on a radial outside of joint portion 11. Each of threaded holes 17 is engageable with a shank portion of a fastening screw (not shown) that is inserted in a through hole formed in each of four boss portions 3g of outer jacket portion 3f.

As shown in FIG. 1, circular opening 13 is formed in bottom wall 5a in a central part of a wall portion surrounded by joint portion 11. Installed in opening 13 is sensor magnet S attached to the one end of motor shaft 3a. Three rectangular openings 14 elongated in a lateral direction are formed on a radial inside of joint portion 11, and located in a position lower than opening 13 when viewed in FIG. 1. First current-carrying terminals (three-phase motor terminals) 3e on the side of the three-phase motor are inserted into openings 14, respectively. A pair of rectangular openings 16 elongated in a vertical direction are formed in left-upper and right-upper positions relative to opening 13 when viewed in FIG. 1. Exposed to openings 16 are tip end portions of current-carrying terminals 15 that connect drive circuit board 7 and control circuit board 8 with each other.

As shown in FIG. 3, bottom wall 5a also includes a plurality of cylindrical board fixing portions 18 that serve to fix control circuit board 8 to bottom wall 5a. Board fixing portions 18 extend upright on an inner surface of bottom wall 5a which is opposed to cover 6. Each of side walls 5b has fitting groove 20 on one end surface (a lower end surface when viewed in FIG. 3) thereof. Fitting groove 20 extends along an outer peripheral edge of casing 5 over an entire periphery thereof. In addition, as shown in FIG. 1, each of side walls 5b has boss portions 19 in predetermined positions on an outer peripheral surface thereof. Boss portions 19 outwardly extend from the outer peripheral surface of side wall 5b, each having a threaded hole (not shown).

As shown in FIG. 1 to FIG. 3, cover 6 has a generally rectangular shape corresponding to an outside shape of casing 5, and closes the open end of casing 5. Cover 6 is made of an aluminum alloy material. Cover 6 has fitting projection 23 on one end surface thereof on a side of casing 5. Fitting projection 23 extends along an outer peripheral edge of cover 6 over an entire periphery thereof, and is engaged in fitting groove 20 of each of side walls 5b.

Cover 6 also has a plurality of threaded holes 21a on left and right peripheral sides thereof. Threaded holes 21a serve to fix drive circuit board 7. Further, cover 6 has boss portions 22 on an outer peripheral surface thereof. Boss portions 22 are formed in positions corresponding to boss portions 19 of each of side walls 5b. Each of boss portions 22 has a through hole corresponding to the threaded hole of each of boss portions 19. A fastening screw (not shown) extends through the through hole of boss portion 22, and is screwed into the threaded hole of boss portion 19. In addition, a heat sink is formed on the other end surface of cover 6 which is located on an opposite side of casing 5.

Electric connector 9 is mounted to the outer peripheral portion of opening 10 of casing 5. As shown in FIG. 1 to FIG. 3 and FIG. 65, electric connector 9 includes first connectors C1, C2, C3 and second connector 28 to which first connectors C1, C2, C3 are fixed. A pair of first connectors C1 are formed by a pair of resin-sealed first current-carrying terminals (power terminals) 25 each being resin-sealed at a substantially central portion thereof in a longitudinal direction thereof. First connector C2 is formed by resin-sealed signal terminals (torque/S, ignition SW, etc.) 26 each being resin-sealed at a substantially central portion thereof in a longitudinal direction thereof. First connector C3 is formed by resin-sealed CAN communication terminals 27 each being resin-sealed at a substantially central portion thereof in a longitudinal direction thereof. Second connector 28 has a generally rectangular shape, and covers opening 10 of casing 5.

Second connector 28 is formed as a connector holder that retains first connectors C1-C3. Second connector 28 has three mount holes 29a extending through second connector 28, into which first connectors C1-C3 are inserted. As shown in FIG. 3, an outer peripheral surface of resin portion 30 of each of first connectors C1-C3 is mated with an inner peripheral surface that defines each of mount hole 29a of second connector 28, so that first connectors C1-C3 are fixedly retained by second connector 28. Specifically, upon coupling first connectors C1-C3 and second connector 28 to each other, respective first connectors C1-C3 are inserted into mount holes 29a of second connector 28 as shown in FIG. 3. After the coupling, a bonding agent (a sealant) is filled into a clearance between each of first connectors C1-C3 and second connector 28, thereby enhancing waterproof and a bonding force in the mutually connecting portions of each of first connectors C1-C3 and second connector 28. Electric connector 9 is formed by first connectors C1-C3 and second connector 28 coupled to each other. Thus constructed electric connector 9 is mounted to the outer peripheral portion of opening 10 of casing 5.

Figure 5A:
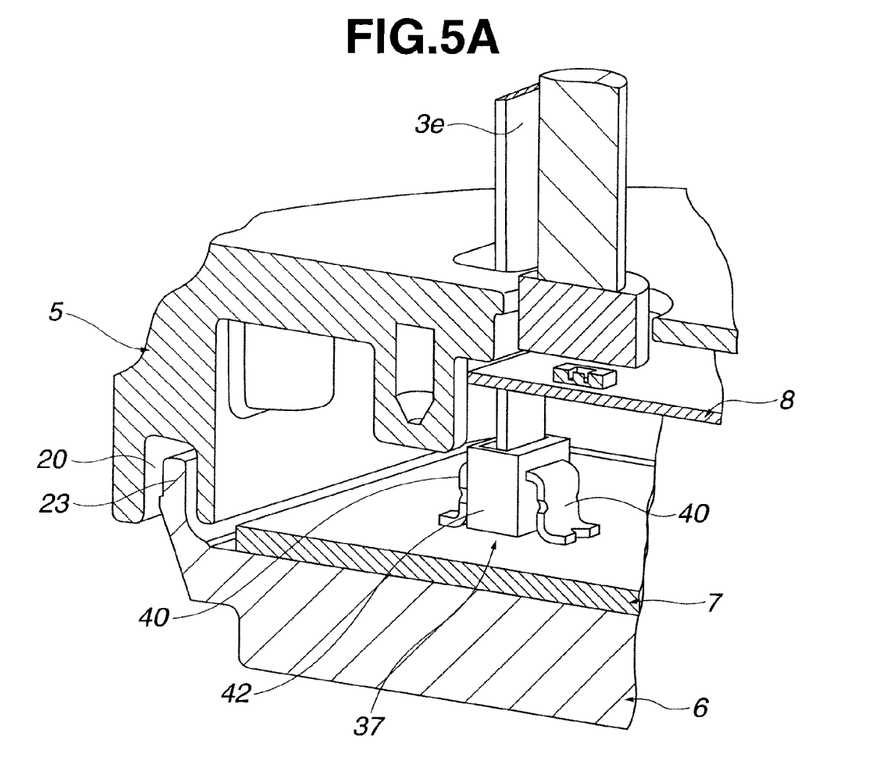
FIG. 5A is an enlarged partial view of the electronic control device according to the first embodiment of the present invention, showing a connection of the second current-carrying terminal on a side of a three-phase motor.
Figure 5B:
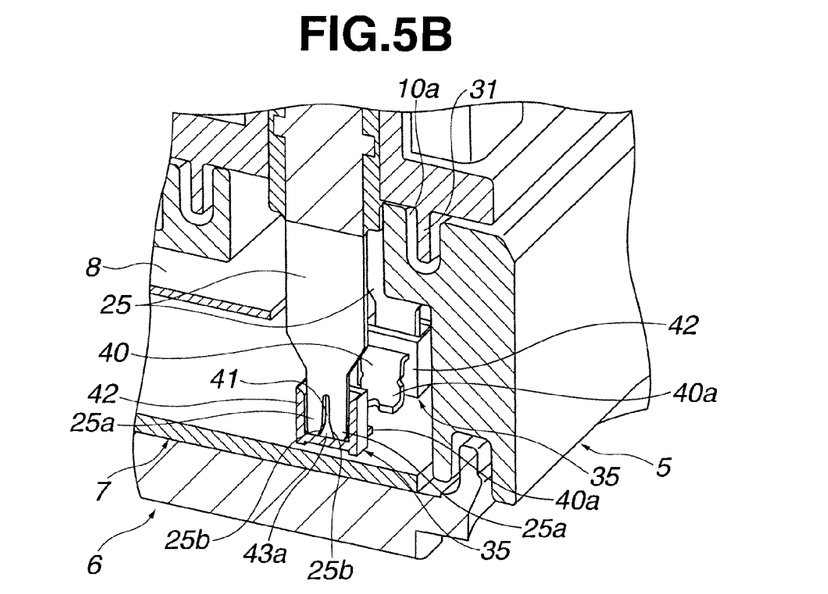
FIG. 5B is an enlarged partial view of the electronic control device according to the first embodiment of the present invention, showing a connection of the second current-carrying terminal on a side of a connector.

Further, as shown in FIG. 2 and FIG. 3, second connector 28 has mount portion 28a on one end surface thereof on the side of casing 5. Mount portion 28a projects toward the projecting portion of casing 5 which surrounds opening 10, and extends corresponding to peripheral groove 10b formed in the outer peripheral portion of opening 10 so that mount portion 28a is fitted into peripheral groove 10b. As shown in FIG. 1, second connector 28 has connector fitting portions 33a-33c on the other end surface thereof on the opposite side of casing 5. Connector fitting portions 33a-33c extend uprightly on the other end surface of second connector 28. Second connector 28 also has through holes 30a at four corners thereof. A fastening screw (not shown) is inserted into each of through holes 30a, and screwed into each of threaded holes 12 of casing 5. In addition, as shown in FIG. 5B, pins 31 are formed on the one end surface of second connector 28 on the side of casing 5, and inserted into holes 10a of casing 5. Pins 31 are disposed between two through holes 30a located at the upper and lower left corners of second connector 28 and between two through holes 30a located at the upper and lower right corners thereof when viewed in FIG. 1. The numbers of holes 10a and the numbers of pins 31 corresponding to holes 10a are different between the left side and the right side when viewed in FIG. 1. In this embodiment, one hole 10a and one pin 31 are formed on the left side, and two holes 10a and two pins 31 are formed on the right side. With such an asymmetric arrangement of holes 10a and pins 31, it is possible to prevent electric connector 9 from being erroneously mounted to casing 5 in a state reversed in the left and right direction.

Each of terminals 25, 26, 27 has one end portion disposed on a side of drive circuit board 7, and the other end portion disposed within connector fitting portions 33a, 33b, 33c. As shown in FIG. 3 and FIG. 6B, the one end portion of each of terminals 26, 27 has a pin shape. In contrast, the one end portion of each of terminals 25 has a tapered strap shape, and is provided with a pair of clip portions 25a at a tip end portion thereof. Clip portions 25a each are tapered such that a generally V-shaped groove is defined between inner peripheral surfaces 25b opposed to each other. Similarly, one end portion of each of first current-carrying terminal 3e on the side of the three-phase motor also has a tapered strap shape, and has a pair of clip portions at a tip end portions thereof.

Connector fitting portions formed in an electric connector of an external device such as a power supply battery (not shown) are fitted to respective connector fitting portions 33a, 33b, 33c, so that terminals of the electric connector of the external device are electrically connected with the other end portions of terminals 25, 26, 27, respectively.

Drive circuit board 7 is related to a power module serving to convert current supplied through electric connector 9 to three-phase (U-phase, V-phase, W-phase) alternating current and drive the electric motor in accordance with a control signal from control circuit board 8.

Figure 4A:
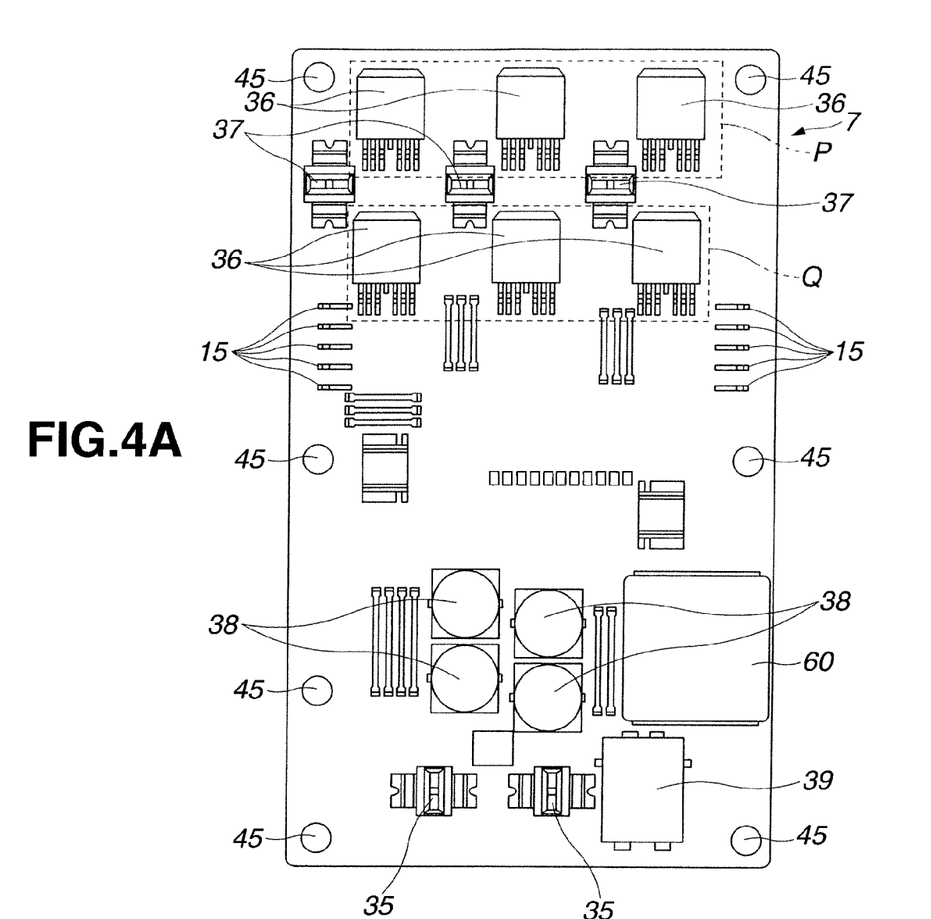
FIG. 4A is a plan view of a drive circuit board of the electronic control device according to the first embodiment of the present invention.

Drive circuit board 7 includes a base plate made of a metal material and a wiring pattern (not shown) formed on the base plate via an insulating layer. As shown in FIG. 4A, drive circuit board 7 has a rectangular shape, and includes second current-carrying terminals 35 for power supply, drive transistors (drive element, switching element) 36, and second current-carrying terminals 37 for the three-phase motor. Second current-carrying terminals 35, drive transistors 36 on upstream side P, drive transistors 36 on downstream side Q, and second current-carrying terminals 37 are mounted on one surface of drive circuit board 7 which is opposed to control circuit board 8. Each of second current-carrying terminals 35 is electrically connected with the one end portion of each of first current-carrying terminals 25. Drive transistor 36 on upstream side P and drive transistor 36 on downstream side Q of each of three pairs are electrically connected with each other in series corresponding to each of the phases of the three-phase alternating current. Each of second current-carrying terminals 37 is electrically connected with the one end portion of each of first current-carrying terminals 3e.

Specifically, as shown in FIG. 4A, the three pairs of drive transistors 36, each including drive transistor 36 on the upstream side P and drive transistor 36 on the downstream side Q corresponding to the three phases of the three-phase alternating current, are arranged on the one surface of drive circuit board 7. Each of second current-carrying terminals 37 is disposed between each pair of the upstream side drive transistor 36 and the downstream side drive transistor 36 so that the three-phase alternating current is supplied to each of first current carrying terminals 3e therethrough.

Figure 4B:
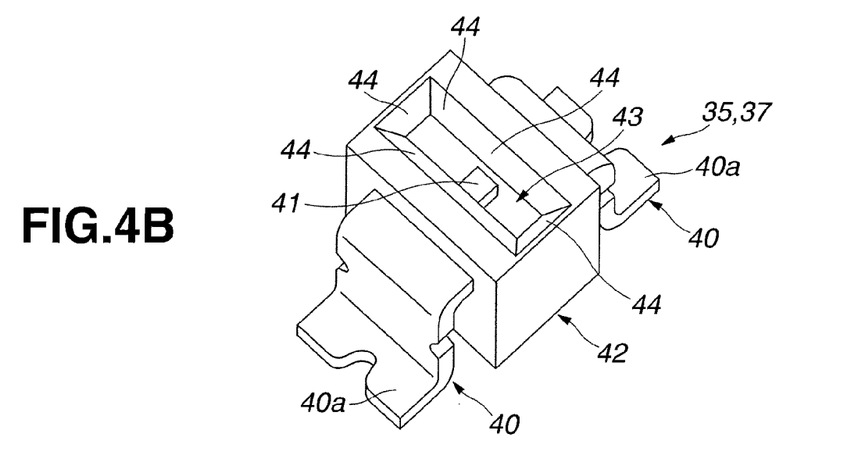
FIG. 4B is an enlarged perspective view of a second current-carrying terminal mounted on the drive circuit board shown in FIG. 4A.

As shown in FIG. 2 and FIG. 3, each of second current-carrying terminals 35 is arranged opposed to the one end portion of each of first current-carrying terminals 25. Each of second current-carrying terminals 37 is arranged opposed to the one end portion of each of first current-carrying terminals 3e. Each of second current-carrying terminals 35, 37 is made of a metal plate, for instance, a copper plate, and bent into a generally crank shape as shown in FIG. 4B. As shown in FIG. 4B, each of second current-carrying terminals 35, 37 includes two crank-shaped split portions 40, 40 and shank portion 41 between split portions 40, 40.

Each of split portions 40, 40 has a generally L-shaped base portion 40a having a bottom surface that is electrically connected to drive circuit board 7 by a suitable method such as soldering, welding or the like. A tip end portion of base portion 40a which is located on a side of shank portion 41, and both end portions of shank portion 41 are embedded in terminal holder 42 that has a generally U-shaped cross section. Terminal holder 42 has opening 43 that extends in a vertical direction (in a direction perpendicular to drive circuit board 7) to be open to an upper surface of terminal holder 42 when viewed in FIG. 4B. Inserted into opening 43 is the one end portion of first current-carrying terminal 25, 3e.

Guide surfaces 44 are formed on four side edges of a rectangular open end of opening 43. Guide surfaces 44 are inclined such that opening 43 is tapered from an upper side of terminal holder 42 toward a lower side thereof when viewed in FIG. 4B. Guide surfaces 44 serve to guide the one end portion of first current-carrying terminal 25, 3e when first current-carrying terminal 25, 3e is inserted into opening 43. As shown in FIG. 5B, support 43a is formed within opening 43, which serves to support shank portion 41. Support 43a may be omitted so that opening 43 may be merely in the form of a through hole. As shown in FIG. 5B, clip portions 25a of first current-carrying terminal 25 cooperate to sandwich shank portion 41 of second current-carrying terminal 35 therebetween and thereby establish electrical connection between first current-carrying terminal 25 and second current-carrying terminal 35. Similarly, as shown in FIG. 5A, first current-carrying terminal 3e and second current-carrying terminal 37 are electrically connected with each other by clipping shank portion 41 of second current-carrying terminal 37 by the clip portions of first current-carrying terminal 3e.

In addition, as shown in FIG. 4A, electronic parts such as smoothing capacitors 38, fail-safe relay 39 in the event of occurrence of fault, coil 60 and the like are mounted on drive circuit board 7. Smoothing capacitors 38 serve to smoothen current supplied through the electrical connection between current-carrying terminals 25, 35 and supply the smoothened current to each of drive transistors 36.

As shown in FIG. 4A, one end portion of each of current-carrying terminals 15 is electrically connected to left and right peripheral portions of drive circuit board 7. Through holes 45 are formed in the left and right peripheral portions of drive circuit board 7. As shown in FIG. 3, fastening screws 46 are inserted into through holes 45, and screwed into threaded holes 21a of cover 6. Drive circuit board 7 is thus fixed to cover 6 through fastening screws 46.

Control circuit board 8 is constituted of a printed circuit board (glass-epoxy circuit board) or a ceramic circuit board. As shown in FIG. 1 and FIG. 6B, control circuit board 8 has a generally rectangular shape, and includes microcomputer (CPU) 51 and Hall element 47. CPU 51 is configured to control respective drive transistors 36. Hall element 47 serves to detect rotation of the electric motor.

As shown in FIG. 1, CPU 51 is mounted onto one surface of control circuit board 8 which is opposed to drive circuit board 7, and Hall element 47 is mounted onto the other surface of control circuit board 8 which is opposed to casing 5. CPU 51 and Hall element 47 are electrically connected with each other through a circuit pattern of control circuit board 8 which serves as a signal transmitting path between CPU 51 and Hall element 47.

Specifically, Hall element 47 is disposed on a peripheral portion of control circuit board 8 (a lower peripheral portion of control circuit board 8 when viewed in FIG. 1), and opposed to sensor magnet S exposed through opening 13 of casing 5 as shown in FIG. 2. Hall element 47 detects a magnetic field of sensor magnet S by using the Hall effect, thereby detecting rotation of motor shaft 3a. A detection signal outputted from Hall element 47 is inputted to CPU 51 through the circuit pattern of control circuit board 8.

As shown in FIG. 6B, the tip end portions of current-carrying terminals 15 are inserted into through holes formed in left and right peripheral portions of control circuit board 8 on the side of Hall element 47, and are electrically connected thereto by a suitable method such as soldering, welding or the like. In addition, cutout portion 52 is formed in a peripheral portion of control circuit board 8 (an upper peripheral portion of control circuit board 8 when viewed in FIG. 1). As shown in FIG. 6B, the one end portion of each of first current-carrying terminals 25 extends through cutout portion 52 toward the side of drive circuit board 7. The one end portion of each of terminals 26 and the one end portion of each of terminals 27 are inserted into through holes formed on left and right sides of cutout portion 52, and are electrically connected thereto, respectively.

With the construction as described above, CPU 51 can control respective drive transistors 36 on the basis of information (for instance, steering torque, vehicle speed signal, etc.) inputted from outside through both terminals 26, 27 of electric connector 9, and the detection signal from Hall element 47.

In addition, as shown in FIG. 6B, through holes 48 are formed in the left and right peripheral portions of control circuit board 8. As shown in FIG. 3, fastening screws 49 extend through through holes 48, and are screwed into threaded holes formed in board fixing portions 18 of casing 5, respectively.

[Assembly Operation]

An operation of assembling electronic control unit 4 will be explained hereinafter. Firstly, control circuit board 8 and electric connector 9 are mounted to casing 5, and drive circuit board 7 is mounted to cover 6.

Upon mounting control circuit board 8 to casing 5, fastening screws 49 are inserted into through holes 48 of control circuit board 8 and screwed into the threaded holes of board fixing portions 18 of casing 5, while holding Hall element 47 on control circuit board 8 in a state opposed to opening 13 of casing 5.

Upon mounting electric connector 9 to casing 5, first connectors C1-C3 constituted of terminals 25-27 each being resin-sealed at the substantially central portion thereof in the longitudinal direction thereof are inserted into second connector 28 and coupled thereto. Subsequently, second connector 28 is mounted to the outer periphery of opening 10 of casing 5. That is, mount portion 28a of second connector 28 is fitted into peripheral groove 10b of casing 5, and pins 31 are inserted into holes 10a of casing 5. After that, the fastening screw (not shown) is inserted into each of through holes 30a, and screwed into each of threaded holes 12 of casing 5. Then, the one end portion of each of terminals 26 and the one end portion of each of terminals 27 are electrically connected to control circuit board 8 by soldering. Next, drive circuit board 7 is mounted to cover 6 by inserting fastening screws 46 into through holes 45 of drive circuit board 7 and screwing fastening screws 46 into threaded holes 21a of cover 6.

Subsequently, casing 5 having electric connector 9 and control circuit board 8, and cover 6 having drive circuit board 7 are coupled to each other in the following manner. The one end portion of each of first current-carrying terminals 25 which projects through opening 10 of casing 5 is allowed to face second current-carrying terminals 35 mounted on drive circuit board 7 through cutout portion 52 of control circuit board 8. While keeping this state, fitting projection 23 of cover 6 is allowed to fit into fitting grooves 20 of casing 5.

At this time, the one end portion of each of first current-carrying terminals 25 is inserted into opening 43 of each of second current-carrying terminals 35 by a force generated when fitting projection 23 of cover 6 is fitted into fitting grooves 20 of casing 5. Specifically, upon assembling casing 5 and cover 6 to each other, clip portions 25a of each of first current-carrying terminals 25 are guided by guide surfaces 44 of each of second current-carrying terminals 35 and moved into opening 43 so that shank portion 41 of second current-carrying terminal 35 is retained in a state sandwiched between inner peripheral surfaces 25b of clip portions 25a.

Accordingly, clip portions 25a are connected with shank portion 41 at a time at which fitting projection 23 of cover 6 is fitted into fitting grooves 20 of casing 5. That is, the connection between clip portions 25a of first current-carrying terminals 25 and shank portion 41 of second current-carrying terminal 35 is established simultaneously with the connection between fitting projection 23 of cover 6 and fitting grooves 20 of casing 5. Thus, direct electrical connection between current-carrying terminals 25, 35 can be established without through a third member for wire bonding or welding (for instance, the DC bus bar of the above-described conventional art). Therefore, the number of parts of the electronic control unit can be reduced, thereby serving to save a cost of the electronic control unit. In addition, owing to the reduction of the number of parts, it is possible to downsize the electronic control unit and simplify the production steps, and therefore, reduce a work labor.

Figure 6A:
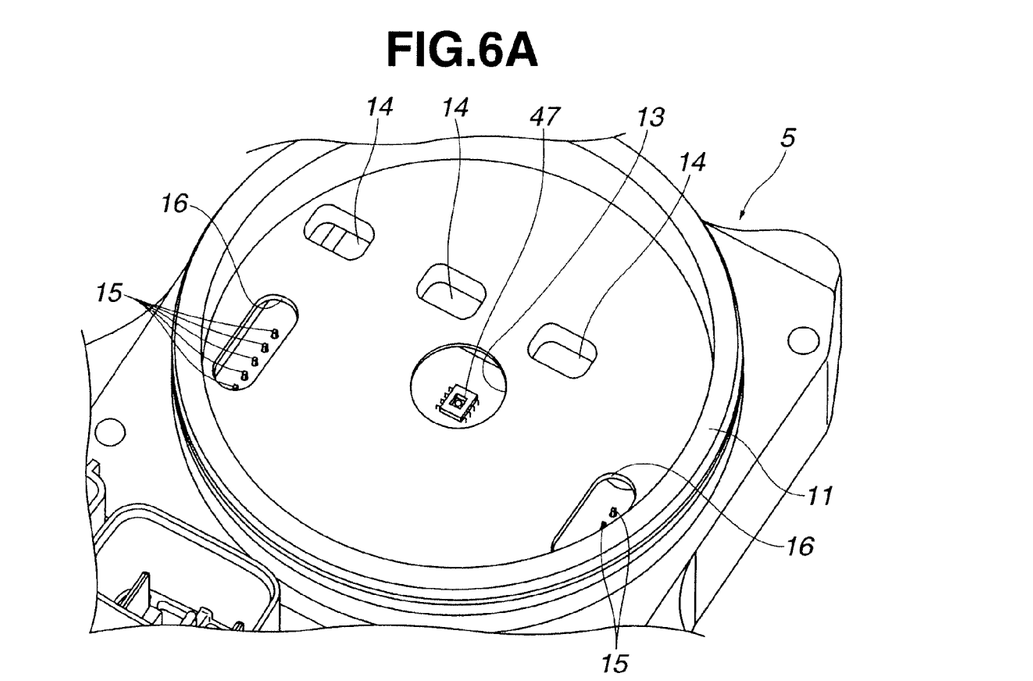
FIG. 6A is a perspective view of a joint portion of a casing of the electronic control device according to the first embodiment of the present invention.
Figure 6B:
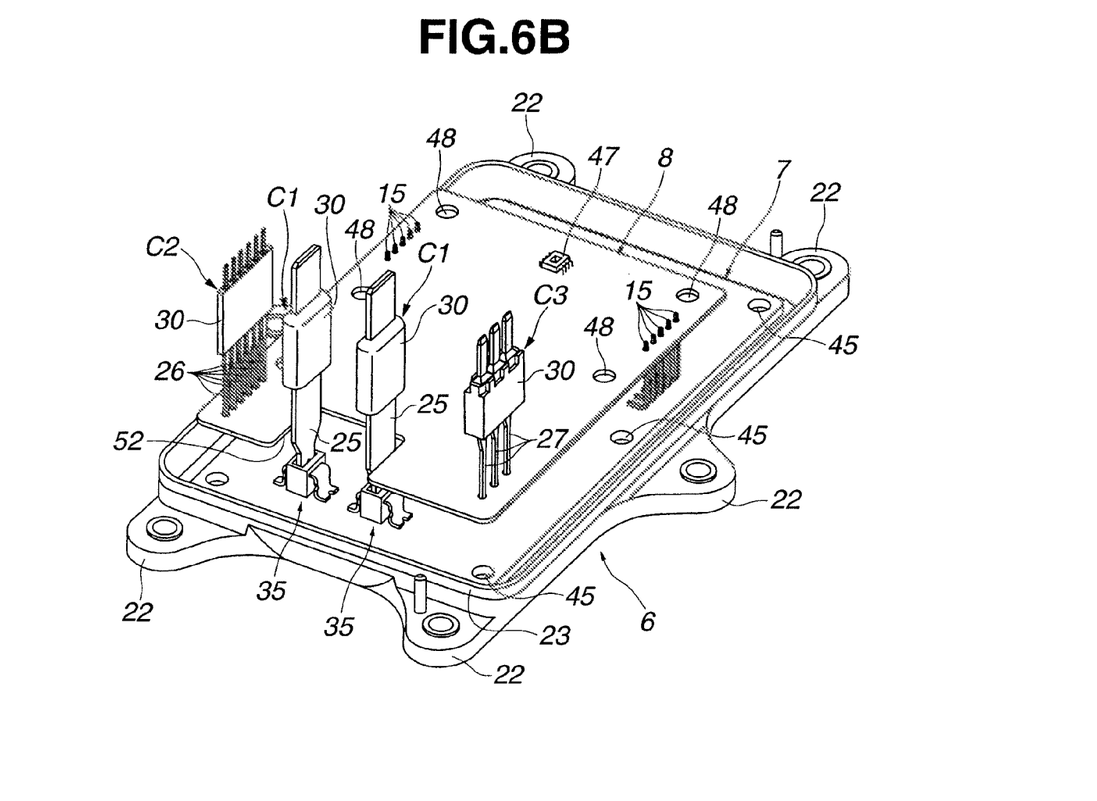
FIG. 6B is a perspective view of the electronic control device according to the first embodiment of the present invention, in which a cover to be connected with the casing is removed.

Upon carrying out the above assembling operation, as shown in FIG. 6A, the tip end portions of current-carrying terminals 15 mounted on drive circuit board 7 are inserted into the through holes of the left and right peripheral portions of control circuit board 8, and are disposed within left and right openings 16 of casing 5. Therefore, after casing 5 and cover 6 are coupled to each other, the tip end portions of current-carrying terminals 15 can be electrically connected to control circuit board 8 by soldering, welding or the like. Thus, drive circuit board 7 and control circuit board 8 can be arranged in a state stacked on each other. After the electrical connection work is carried out, the fastening screws are inserted into the through holes of boss portions 22 of cover 6 and screwed into the threaded holes of boss portions 19 of casing 5, so that casing 5 and cover 6 are coupled to each other. Thus, the assembling operation is completed.

After the above assembling operation, electronic control unit 4 is mounted to motor unit 3. Upon mounting electronic control unit 4 to motor unit 3, joint portion 11 of casing 5 is allowed to fit into opening 3d of outer jacket portion 3f of motor housing 3c and then fit into opening 3d. At this time, the one end portion of each of first current-carrying terminals 3e is opposed to each of openings 14 of casing 5. Therefore, the one end portion of each of first current-carrying terminals 3e is allowed to fit into opening 43 of each of second current-carrying terminals 37 at a time at which joint portion 11 is fitted into opening 3d. That is, the connection between the one end portion of each of first current-carrying terminals 3e and each of second current-carrying terminals 37 is established simultaneously with the connection between joint portion 11 of casing 5 and opening 3d of motor housing 3c. Accordingly, the clip portions of the one end portion of each of first current-carrying terminals 3e are connected with shank portion 41 of each of second current-carrying terminals 37, so that direct electrical connection between current-carrying terminals 3e, 37 can be established. With this construction, the above-described third member can be omitted, thereby serving to reduce the number of parts.

After that, electronic control unit 4 is mounted to motor housing 3c by inserting a fastening screw (not shown) into the through hole of each of boss portions 3g of motor housing 3c and screwing the fastening screw into each of threaded holes 17 of casing 5. Thus, the electric motor and the power module are fixed to separate housings (casing 5 and cover 6), and therefore, thermal interference occurring in the electric motor and the power module can be suppressed to thereby enhance heat radiation performance.

Further, on drive circuit board 7, each of second current-carrying terminals 37 is arranged between each pair of drive transistor 36 on the upstream side P and drive transistor 36 on the downstream side Q. With this arrangement, interference between motor shaft 3a of the electric motor and second current-carrying terminals 37 can be suppressed. Further, it is possible to reduce a wiring distance between second current-carrying terminals 37 and the upstream side drive transistors 36 and a wiring distance between second current-carrying terminals 37 and the downstream side drive transistors 36, and thereby prevent the wiring from being complicated. Incidentally, the assembly procedure can be modified such that motor unit 3 and casing 5 are assembled to each other before casing 5 and cover 6 are assembled to each other

[Second Embodiment]

Figure 8:
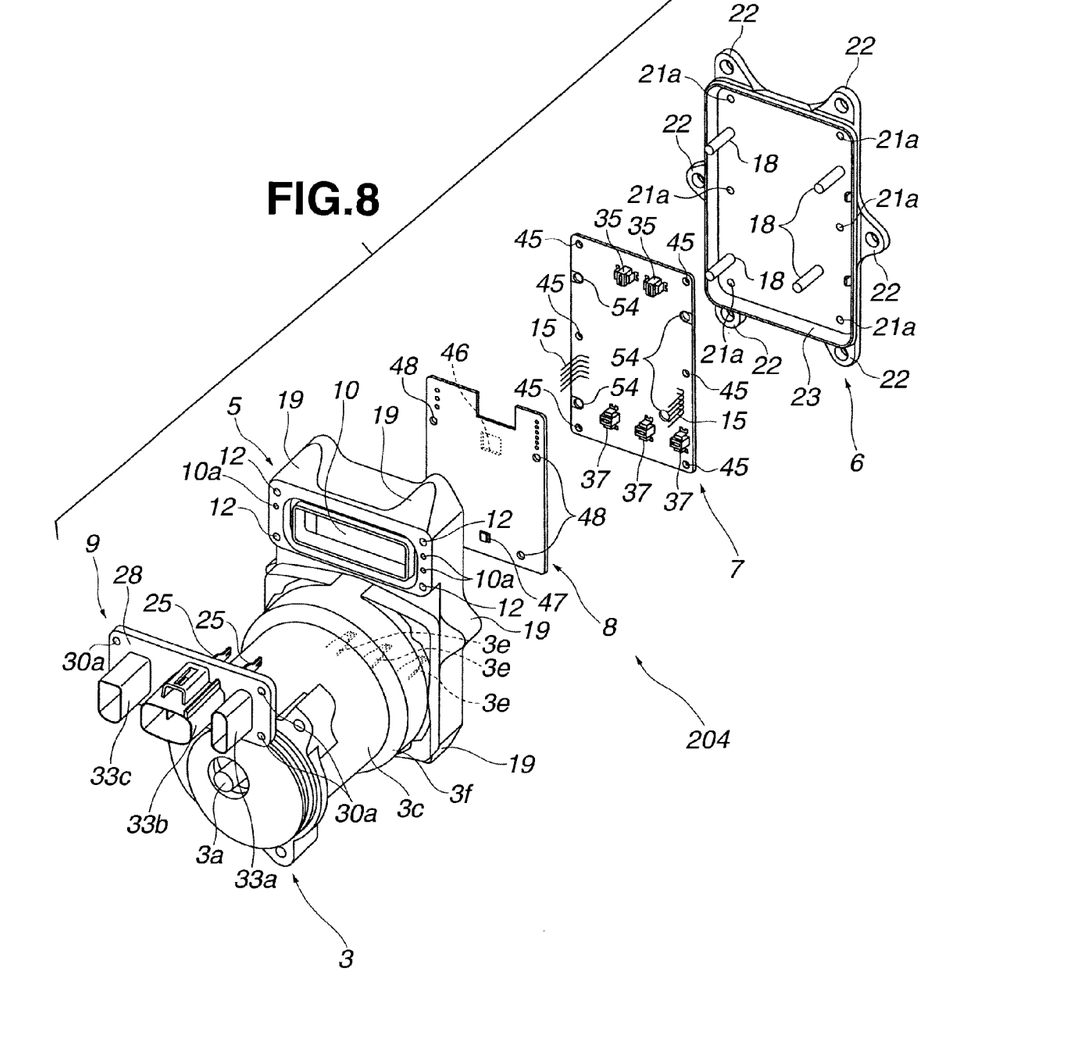
FIG. 8 is an exploded perspective view of an electronic control device according to a second embodiment of the present invention.
Figure 9:
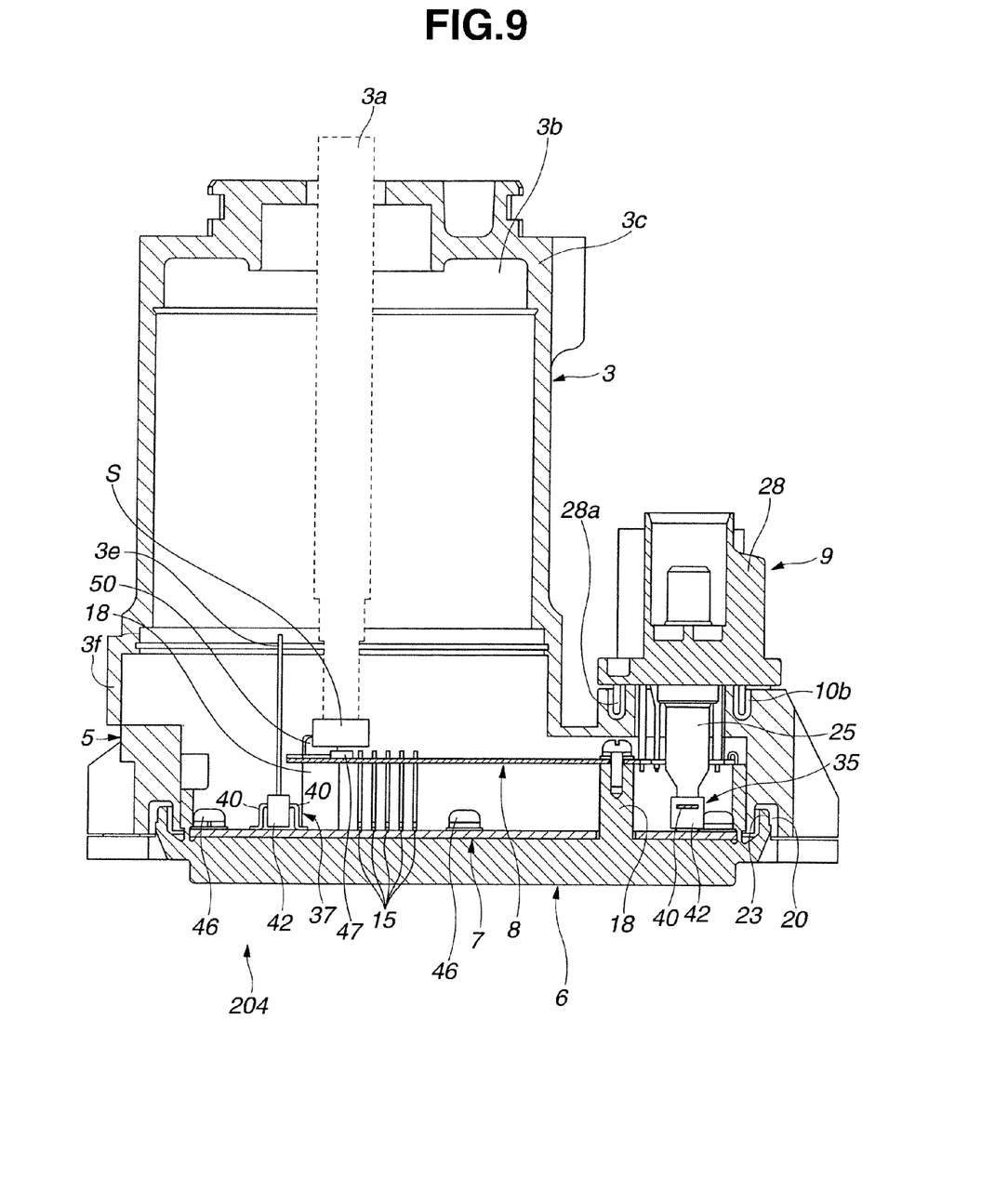
FIG. 9 is a vertical cross section of an essential part of the electronic control device according to the second embodiment of the present invention which is mounted to a motor unit.
Figure 10:
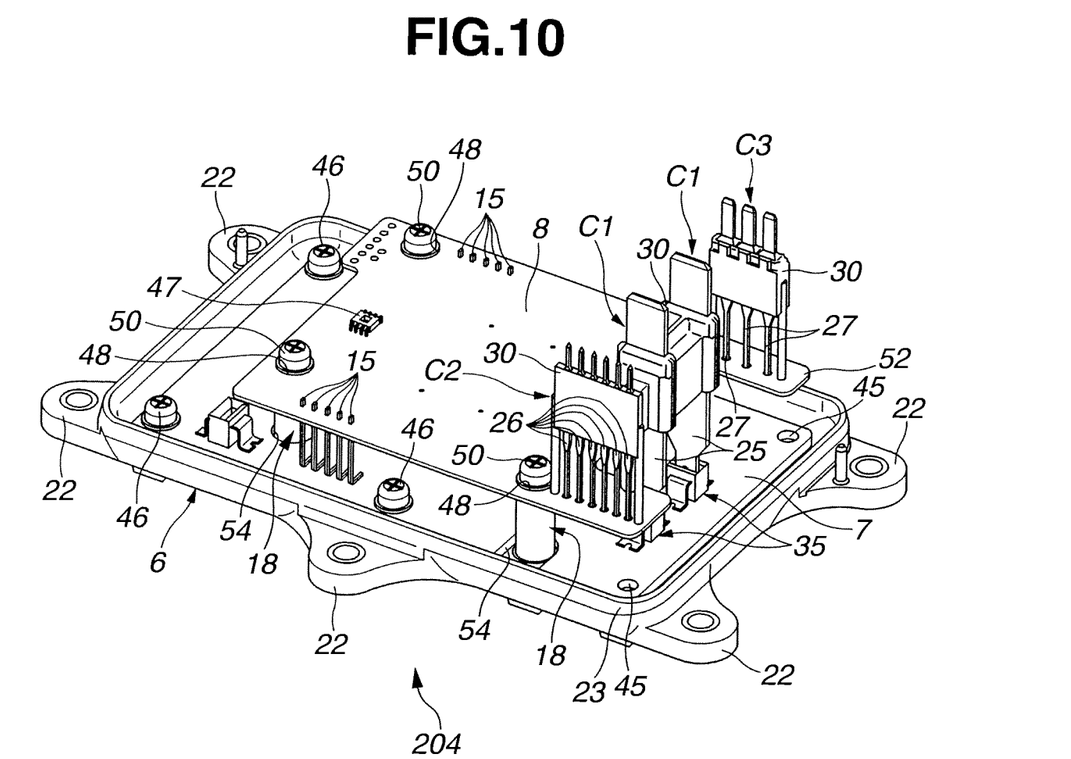
FIG. 10 is a perspective view of the electronic control device according to the second embodiment of the present invention, showing a cover equipped with a drive circuit hoard and a control circuit board.

Referring to FIG. 8 to FIG. 10, an electronic control unit according to a second embodiment of the present invention will be explained hereinafter. The second embodiment differs from the first embodiment in construction of a casing, a cover, a drive circuit board and a control circuit board. Like reference numerals denote like parts, and therefore, detailed explanations therefor are omitted. As shown in FIG. 8, electronic control unit 204 according to the second embodiment includes casing 5 formed integrally with outer jacket portion 3f of motor housing 3c. Casing 5 has no joint portion corresponding to joint portion 11 of the first embodiment, and no through holes in boss portions 3g of outer jacket portion 3f.

As shown in FIG. 9 and FIG. 10, board fixing portions 18 extend upright on one surface of cover 6 which is opposed to drive circuit board V. Each of board fixing portions 18 extends through through hole (or groove) 54 of drive circuit board 7 and through hole 48 of control circuit board 8 which are formed corresponding to board fixing portion 18. Fastening screw 50 is screwed into a threaded hole formed in one end portion of each of board fixing portions 18, thereby fixing control circuit board 8 to cover 6.

Upon assembling electronic control unit 204 to motor unit 3, firstly, drive circuit board 7 and control circuit board 8 are mounted onto cover 6. Upon mounting drive circuit board 7 onto cover 6, board fixing portions 18 are inserted through holes (or grooves) 54 of drive circuit board 7. While keeping this state, fastening screws 46 are inserted into through holes 45 and screwed into threaded holes 21a of cover 6.

Subsequently, control circuit board 8 is mounted onto cover 6. Fastening screws 50 are screwed into the threaded holes of board fixing portions 18, while the tip end portions of current-carrying terminals 15 on drive circuit board 7 are inserted into the corresponding through holes of control circuit board 8. After that, the tip end portions of current-carrying terminals 15 are electrically connected to control circuit board 8 by soldering or the like.

Next, the one end portion of each of first current-carrying terminals 25 of a pair of first connectors C1 of electric connector 9 is connected to each of first current-carrying terminals 35 of drive circuit board 7. The one end portion of each of signal terminals 26 of first connectors C2 and the one end portion of each of CAN communication terminals 27 of first connectors C3 are electrically connected to control circuit board 8 by soldering or the like. After the electrical connection work is completed, second connector 28 is mounted to the outer periphery of opening 10 of casing 5.

While keeping this state, casing 5 and cover 6 are coupled to each other in the same manner as explained in the first embodiment. By conducting the assembling operation, each of first connectors C1-C3 is inserted into each of mount holes 29a of second connector 28 so that first connectors C1-C3 are connected to second connector 28. Subsequently, a bonding agent (a sealant) is filled into a clearance between each of first connectors C1-C3 and second connector 28, thereby enhancing waterproof and a bonding force in the mutually connecting portions of each of first connectors C1-C3 and second connector 28.

In electronic control unit 4 according to the second embodiment, casing 5 and outer jacket portion 3f of motor housing 3c are formed integrally with each other. In a case where respective parts of the electric motor are inserted into motor housing 3c and assembled to each other within motor housing 3c, the parts of the electric motor must be inserted into motor housing 3c through an inside of casing 5.

Therefore, casing 5 of the second embodiment has an opening through which the parts of the electric motor can be inserted into motor housing 3c without being closed with a wall portion corresponding to the wall portion surrounded by joint portion 11 of casing 5 of the first embodiment. Due to the formation of the opening in casing 5 of the second embodiment, board fixing portions 18 are formed on not casing 5 but cover 6 to thereby ensure fixing of control circuit board 8 relative to cover 6.

[Modification]

Figure 11:
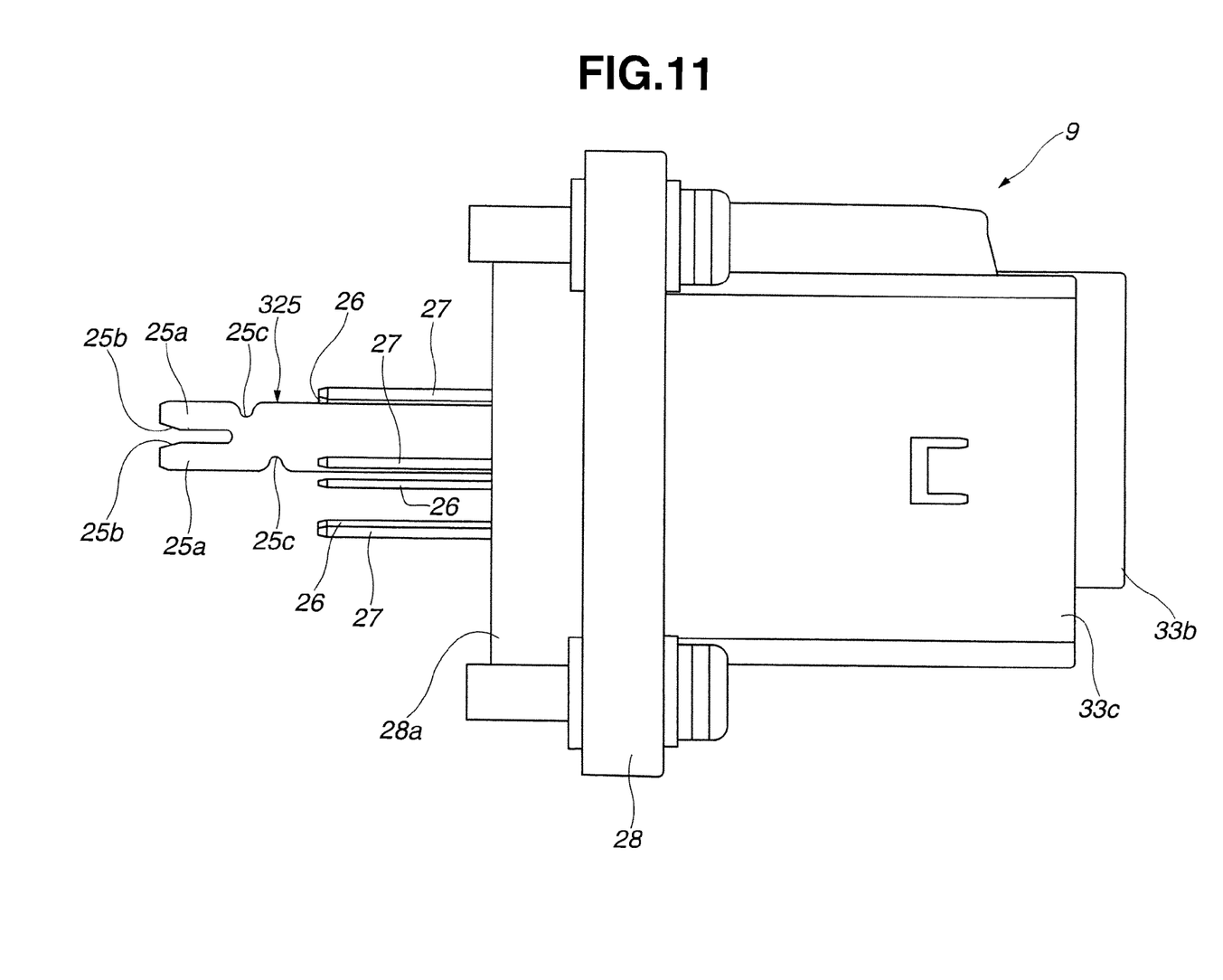
FIG. 11 is a side view of a modification of a first current-carrying terminal (a power terminal) of the electronic control device according to the second embodiment of the present invention.

Referring to FIG. 11, a modification of the first embodiment will be explained. As shown in FIG. 11, in the electronic control unit according to the modification, each of first current-carrying terminal (power terminal) 325 has a pair of semicircular cutout portions 25c in one end portion thereof before clip portions 25a. Cutout portions 25c are formed in both side edges of the one end portion of first current-carrying terminal 325. Cutout portions 25c are arranged offset relative to each other in a length direction (longitudinal direction) of first current-carrying terminal 325.

With the provision of cutout portions 25c, first current-carrying terminal 325 can be readily deformed in both a thickness direction of first current-carrying terminal 325 and a width direction of first current-carrying terminal 325. It is noted that an amount of deformation of first current-carrying terminal 325 in the thickness direction of first current-carrying terminal 325 is larger than an amount of deformation thereof in the width direction thereof.

Even in a case where the one end portion of first current-carrying terminal 325 is offset relative to opening 43 of terminal holder 42 upon being inserted into terminal holder 42, the one end portion of first current-carrying terminal 325 is deformed as clip portions 25a are moved into opening 43 along guide surfaces 44 of terminal holder 42, and therefore, it is possible to reduce stress that is generated upon insertion of the one end portion of first current-carrying terminal 325. As a result, a load that is exerted on drive circuit board 7 due to the stress can be reduced to thereby suppress or deterioration in soldered portions of split portions 40 of second current-carrying terminal 35 which are soldered to drive circuit board 7.

Cutout portions 25c can be formed in not only first current-carrying terminal 325 but also first current-carrying terminal 3e on the side of the three-phase motor. In such a case, cutout portions 25c are formed in both side edges of the one end portion of first current-carrying terminal 3e in an offset relation to each other in a length direction thereof. With the provision of cutout portions 25c, stress that is generated upon insertion of first current-carrying terminal 3e into second current-carrying terminal 37 can be reduced to thereby suppress breakage or deterioration in soldered portions of split portions 40 of second current-carrying terminal 35 which are soldered to drive circuit board 7.

The electronic control device of the present invention can be applied to not only the electric power steering apparatus described above but also an electric power brake apparatus of an automobile, a variable valve operating apparatus of an internal combustion engine, and the like.

Further, in the electronic control device according to the embodiments of the present invention, first current-carrying terminals 3e can be connected with motor-side terminals by coupling casing 5 and cover 6 to each other in the following manner. Firstly, first connectors C1-C3 each resin-sealed at the substantially central portion thereof are connected with second connector 28 by inserting first connectors C1-C3 into mount holes 29a of second connector 28. After that, a bonding agent (a sealant) is filled into a clearance between each of first connectors C1-C3 and second connector 28, thereby enhancing waterproof and a bonding force in the mutually connecting portions of each of first connectors C1-C3 and second connector 28.

Subsequently, electric connector 9 is mounted to the outer periphery of opening 10 of casing 5, and the one end portion of each of first current-carrying terminals 3e is connected to each of second current-carrying terminals 37 on drive circuit board 7. While keeping this state, motor housing 3c and casing 5 are assembled to each other. At this time, the other end portion of each of first current-carrying terminals 3e is connected with each of the motor-side terminals within motor housing 3c at a time at which the one end portion of each of first current-carrying terminals 25 is connected to each of second current-carrying terminals 35 on drive circuit board 7.

That is, the connection between the other end portion of each of first current-carrying terminals 3e and each of the motor-side terminals is established simultaneously with the connection between the one end portion of each of first current-carrying terminals 25 and each of second current-carrying terminals 35.

Further, the electronic control device of the present invention is not particularly limited to the embodiments in which fitting groove 20 is formed in casing 5 and fitting projection 23 is formed on cover 6. The fitting groove may be formed in the cover, and the fitting projection may be formed on the casing.

This application is based on a prior Japanese Patent Application No. 2013-52782 filed on Mar. 15, 2013. The entire contents of the Japanese Patent Application No. 2013-52782 are hereby incorporated by reference.

Although the invention has been described above by reference to embodiments and modification of the invention, the invention is not limited to the embodiments and modification described above. Further variations of the embodiments described above will occur to those skilled in the art in light of the above teachings. The scope of the invention is defined with reference to the following claims.

What is claimed is:

1. An electronic control device for controlling an operation of an electric motor for use in a vehicle that is driven by the electric motor, the electronic control device comprising:
   two housings coupled to each other;
   a first circuit board disposed in one of the two housings;
   a first terminal disposed on a side of the other of the two housings;
   a second terminal disposed on the first circuit board in an opposed relation to the first terminal, wherein the first terminal and the second terminal are brought into direct connection with each other at a time at which the two housings are coupled to each other; and
   a plurality of drive elements that serve to drive the electric motor, the plurality of drive elements being mounted onto the first circuit board, and a second circuit board that serves to control the plurality of drive elements, the second circuit board being mounted onto the other of the two housings, wherein the electric motor is disposed on a side of the other of the two housings.

2. The electronic control device as claimed in claim 1, further comprising a current-carrying terminal through which the first circuit board and the second circuit board are electrically connected with each other, the current-carrying terminal having a tip end portion being exposed to an opening formed in the other of the two housings.

3. The electronic control device as claimed in claim 1, wherein the first terminal has a pair of clip portions in one end portion thereof, and the second terminal comprises two crank-shaped split portions and a shank portion between the split portions, the shank portion being sandwiched between the pair of clip portions to thereby establish electrical connection between the first terminal and the second terminal.

4. An electronic control device for controlling an operation of an electric motor for use in a vehicle that is driven by the electric motor, the electronic control device comprising:
   two housings coupled to each other;
   a first circuit board disposed in one of the two housings;
   a first terminal disposed on a side of the other of the two housings;
   a second terminal disposed on the first circuit board in an opposed relation to the first terminal, wherein the first terminal and the second terminal are brought into direct connection with each other at a time at which the two housings are coupled to each other; and a pair of drive elements that serve to drive the electric motor, the pair of drive elements being connected with each other in series and mounted onto the first circuit board, wherein the second terminal comprises a current-carrying terminal that serves to supply electric current to the electric motor, the current-carrying terminal being disposed between the pair of drive elements.

5. The electronic control device as claimed in claim 4, further comprising a fitting projection formed on the one of the two housings to extend along an outer peripheral edge of the one of the two housings, and a fitting groove formed in the other of the two housings to be engaged with the fitting projection, the fitting projection and the fitting groove cooperating with each other to couple the two housings to each other, wherein the first terminal and the second terminal are brought into direct connection with each other at a time at which the fitting projection and the fitting groove are engaged with each other.

6. The electronic control device as claimed in claim 4, wherein the other of the two housings comprises an opening into which one end portion of the first terminal is inserted, and a joint portion that extends toward the electric motor, wherein the one end portion of the first terminal and the second terminal are brought into direct connection with each other at a time at which the joint portion is fitted to the electric motor.

7. An electronic control device for controlling an operation of an electric motor for use in a vehicle that is driven by the electric motor, the electronic control device comprising:

two housings coupled to each other;

a first circuit board disposed in one of the two housings;

a first terminal disposed on a side of the other of the two housings;

a second terminal disposed on the first circuit board in an opposed relation to the first terminal, wherein the first terminal and the second terminal are brought into direct connection with each other at a time at which the two housings are coupled to each other; and a plurality of drive elements that serve to drive the electric motor, the plurality of drive elements being mounted onto the first circuit board, and a second circuit board that serves to control the plurality of drive elements, the second circuit board being mounted onto the one of the two housings, wherein the electric motor is disposed on a side of the other of the two housings.

8. The electronic control device as claimed in claim 7, wherein the first terminal comprises a pair of cutout portions formed in both side edges of the one end portion of the first terminal, the cutout portions being arranged offset relative to each other in a length direction of the first terminal.

* * * * *